United States Patent [19]

Braithwaite et al.

[11] 4,388,871

[45] Jun. 21, 1983

[54] SPEED CONTROL SYSTEM FOR A PIPELINE INSPECTION VEHICLE

[75] Inventors: John C. Braithwaite, Ponteland; Ian Smith, Ashington, both of England

[73] Assignee: British Gas Corporation, London, England

[21] Appl. No.: 286,533

[22] Filed: Jul. 24, 1981

Related U.S. Application Data

[60] Division of Ser. No. 182,658, Aug. 29, 1980, which is a continuation of Ser. No. 928,408, Jul. 27, 1978, abandoned.

[30] Foreign Application Priority Data

Jul. 27, 1977 [GB] United Kingdom ................ 3150/77

[51] Int. Cl.³ .............................................. B65G 51/20
[52] U.S. Cl. ................................ 104/138 G; 105/365; 188/83; 406/10
[58] Field of Search ............... 104/138 R, 138 G, 155; 406/10, 13; 188/83, 181 R; 105/365; 15/104.03, 104.05, 104.3 R; 134/166 C, 167 C, 168 C, 169 C; 33/1 H, 178 F; 73/40, 40.5 R, 40.5 A; 250/321, 358 P

[56] References Cited

U.S. PATENT DOCUMENTS

| 2,127,429 | 8/1938 | Schoepf et al. | 188/181 R X |
| 2,617,499 | 11/1952 | Jenkins et al. | 188/181 R X |
| 2,651,387 | 9/1953 | Genter | 188/181 R |
| 3,036,530 | 5/1962 | Mills et al. | 104/138 G |
| 3,243,697 | 3/1966 | Schmidt | 104/138 G X |
| 3,495,546 | 2/1970 | Brown et al. | 104/138 G X |
| 3,758,050 | 9/1973 | Watts et al. | 104/138 R X |

Primary Examiner—Randolph Reese
Attorney, Agent, or Firm—Watson, Cole, Grindle & Watson

[57] ABSTRACT

A pipeline inspection system in which a vehicle, which has sensors to detect flaws in the pipeline, is moveable within the pipeline by a fluid flowing in the pipeline, and wherein a speed control for the vehicle is provided by a braking device which imposes a continuous axial drag on the pipeline wall. This continuous axial drag is adjustable between upper and lower limits such that the summation of the variable drag characteristics of the pipeline and the imposed drag remains approximately constant and the vehicle will move at a speed substantially equal to the average flow velocity of the fluid in the pipeline.

3 Claims, 5 Drawing Figures

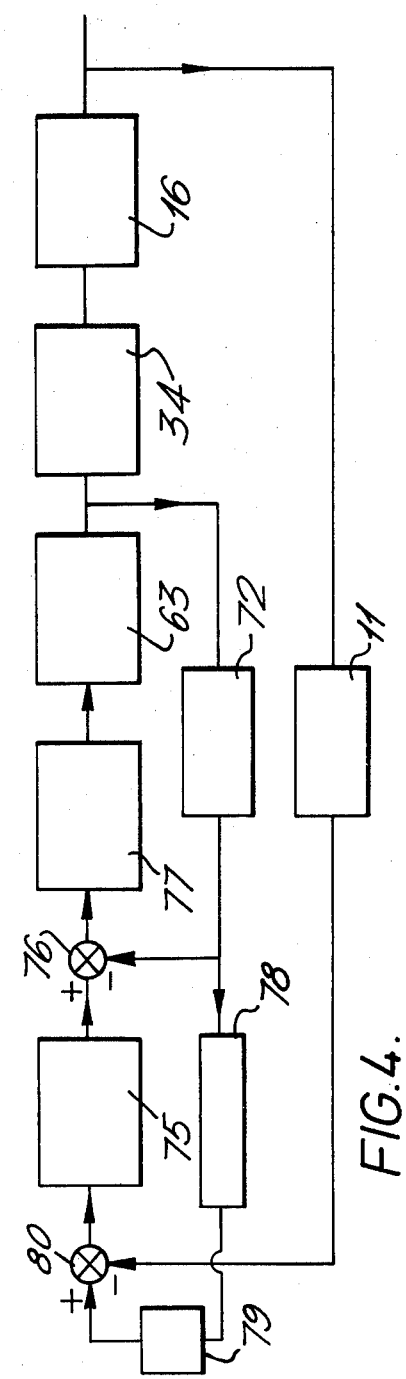

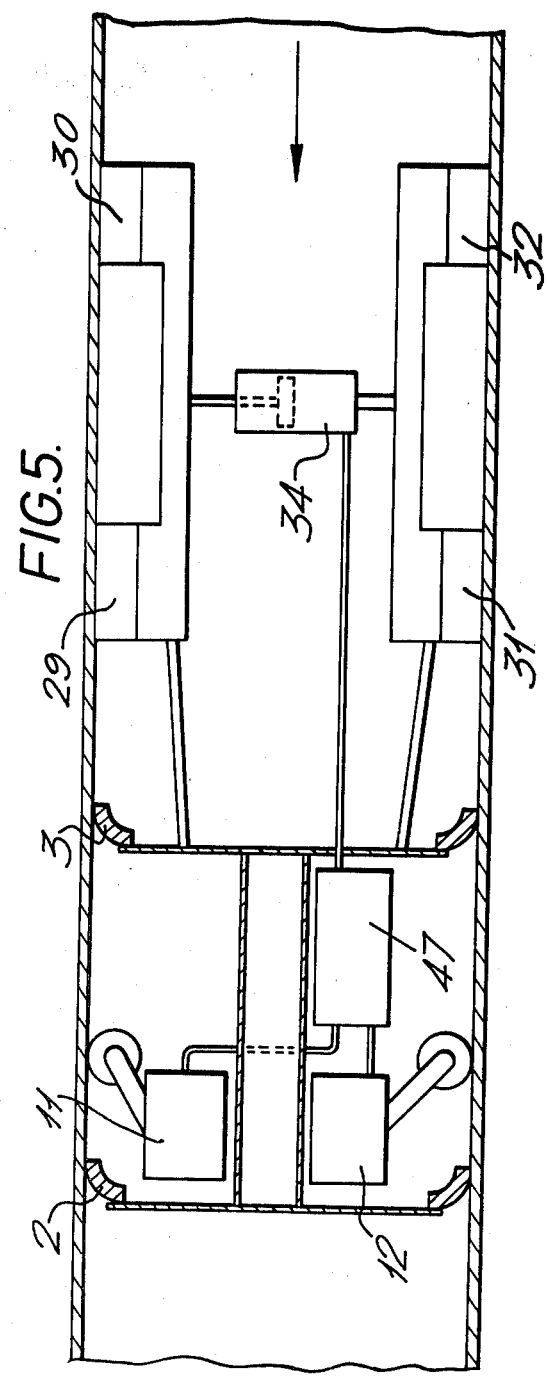

SPEED CONTROL SYSTEM FOR A PIPELINE INSPECTION VEHICLE

This application is a divisional application of application Ser. No. 182,658, filed Aug. 29, 1980, which in turn was a continuation application of application Ser. No. 928,408, filed July 27, 1978, now abandoned.

BACKGROUND OF THE INVENTION

1. Field of the Invention

This invention relates to a pipeline inspection vehicle, and more specifically to a device for controlling the speed of the vehicle within the pipeline.

2. The Prior Art

A common way of inspecting internal surfaces of oil or gas pipelines is to use a pipeline inspection vehicle which is provided with the necessary instrumentation for inspection of the pipeline and which is usually driven along within the pipeline by oil or gas flow which reacts with resilient scraper cups that are mounted to be around the body of the vehicle and to be in close relation to the pipe internal wall. A driving force is therefore provided by a differential pressure acting across the resilient scraper cups. Variations in the differential pressure can, however, lead to fluctuations in vehicle speeds, with consequent high and unacceptable accelerations and decelerations. Usually the differential variations are caused by changes in wall friction characteristics, welds, junctions, bends and change of inclination of the pipeline.

One form of pipeline inspection vehicle is disclosed in U.S. Pat. No. 3,495,546. This vehicle is provided with a speed control which features a bypass valve to allow gas within the pipeline to bypass the resilient cups and hence control the differential pressure across the cups.

The use of a by-pass system has not proved completely satisfactory as a speed control system, however, because of the delay in the response time of the vehicle when the by-pass valves are operated, i.e., due to the inherent characteristics of oil or gaseous flow. The system is not sensitive enough for accurate inspection purposes.

It is an object of the present invention to provide a speed control system for a pipeline inspection vehicle such that the vehicle is constrained to travel at approximately the average speed of the fluid flowing in the pipeline and to vary only within acceptable limits without violent accelerations or decelerations.

It is conventional to use more than one inspection vehicle in a pipeline inspection system, for example, two or more vehicles can be formed as a train with one of the vehicles providing the traction force, the others carrying the inspection, recording instruments and auxiliary equipment. That is not to say that the tractor vehicle does not carry auxiliary equipment since the location of the equipment is determined primarily by the space and operating requirements. The speed control system as described in this invention may be applied to the tractor vehicle or to a towed vehicle.

A method of carrying out the invention is described below with reference to drawings which illustrate by way of example only one specific embodiment.

DESCRIPTION OF THE DRAWINGS

In the drawings:

FIG. 4 is a block diagram of the braking control system; and

FIG. 5 is diagrammatic sketch of a composite pipeline inspection vehicle showing the braking system.

DETAILED DESCRIPTION OF THE PREFERRED EMBODIMENT

The invention is described in relation to two pipeline inspection vehicles which are linked together by a flexible coupling means, the braking and speed control system being located on the second or towed vehicle.

Figure 1:
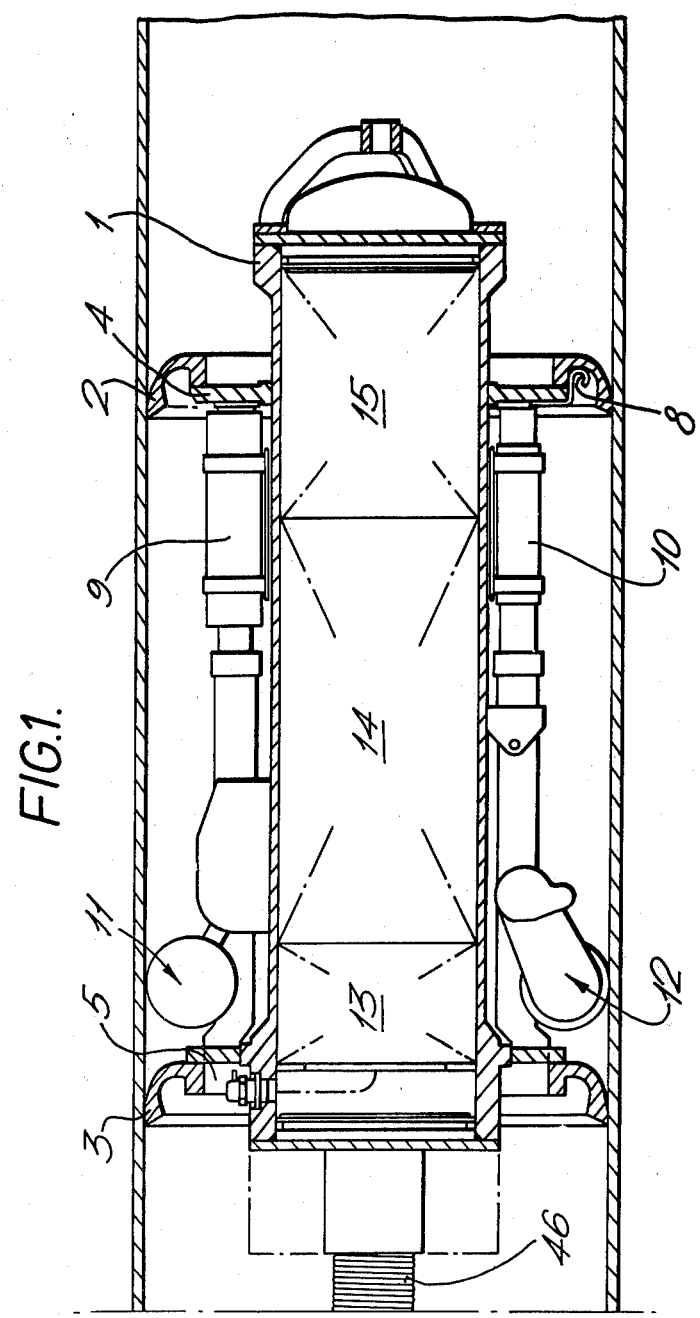
FIG. 1 is a side sectional elevation of a first tractor vehicle.

With reference to FIG. 1, the tractor vehicle comprises a main tubular body 1 which is provided with flexible polyurethane driving cups, 2 and 3. The flexible cups 2 and 3 are attached to flange-like projections 4 and 5 from the hollow main body 1. Wheel-driven hydraulic pumps 12 and a velocity transducer 11 are mounted on the outer periphery of the main body 1. Interim compartments 13, 14 and 15 of the hollow main body can be used to house instrumentation such as data recorders, signal processing equipment or batteries (not shown).

Pump 12 supplies hydraulic fluid to a high pressure hydraulic accumulator 10 and a low pressure accumulator 9.

The (first) traction vehicle is coupled to the towed (second) vehicle through a flexible coupling 46.

Figure 2:
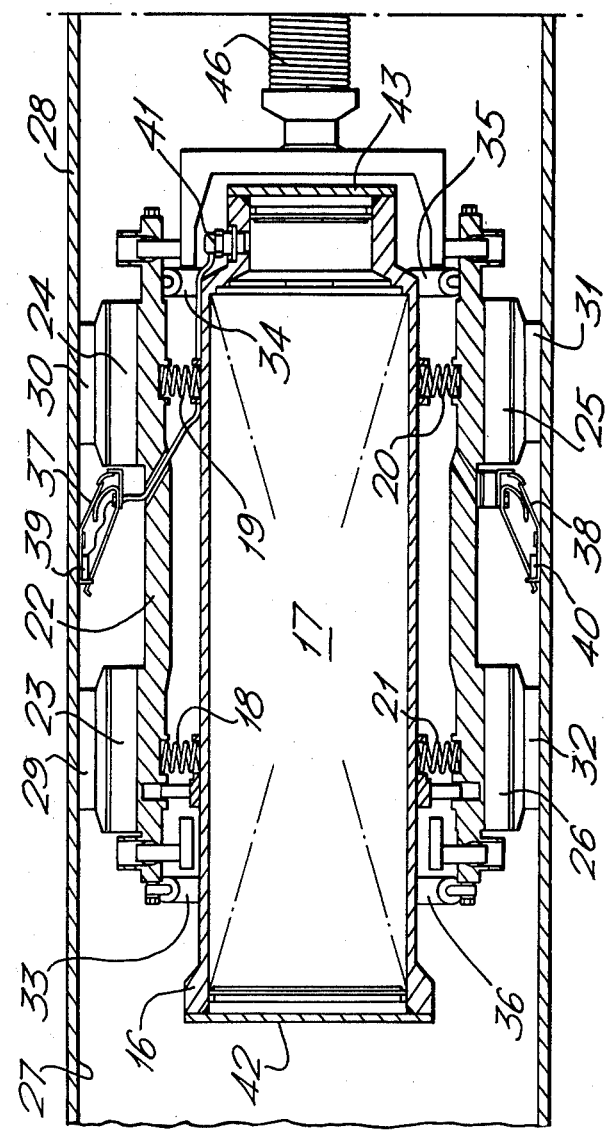
FIG. 2 is a side sectional elevation of a second trailed instrument vehicle which is connected to the vehicle of FIG. 1.

FIG. 2 shows a towed instrument vehicle which detects faults using a magnetic flux technique in which sensors are carried on flexible sensing shoes to detect changes in magnetic flux caused by disconformaties in the pipe wall, the flux being induced by magnets carried on the vehicle.

The towed instrument vehicle comprises a hollow main body 16 having an inner chamber 17 which contains signal processing equipment (not shown). Suspended from the main body 16 by springs 18, 19, 20 and 21 are several magnetic return paths 22 each of which support magnetic members, four of which are shown as 23, 24, 25 and 26. Mounted on top of these magnetic members and in contact with the internal surface 27 of the pipeline 28 are brake pads 29, 30, 31 and 32. The brake pads may conveniently be formed by steel bristles held in a backing plate. Attached to the ends of the magnetic return paths 22 are pressure-applying suspension hydraulic rams 33, 34, 35 and 36 which force the return paths radially outwards and so force the brake pads into contact with the inner surface of the pipe wall.

Mounted upon a ring suspended from the return paths 22 are a plurality of sensing shoes, two of which 37 and 38 are shown, the sensing shoes are described in U.K. Pat. No. 1535352.

Flux sensors 39 and 40 mounted on sensing shoes 37 and 38 are electrically connected by means of an electrical socket 41 to signal processing equipment within the chamber 17. The signal processing equipment is maintained in a gas free state by end caps 42 and 43 mounted at each end of the chamber 17.

FIG. 5 illustrates in diagrammatic form the speed control system as applied to the total inspection system. Brake pads 29, 30, 31 and 32 are forced into braking contact with the pipe wall by the high pressure hydraulic ram 34. The pressure applied by the ram 34 is controlled by the hydraulic control system 47 acting in conjunction with the vehicle speed transducer 11.

The pipeline inspection system described in FIG. 5 provides a vehicle moveable within the pipeline by a fluid flowing in the pipeline, the speed control for the vehicle including a braking system which imposes a continuous axial drag on the pipeline wall, and means for altering the pressure exerted between the brake pad and the wall within set limits and in relation to changes in the drag characteristic of the pipeline as measured by the change in the actual speed of the vehicle from a pre-determined desired speed, thus varying the imposed axial drag between upper and lower limits such that the summation of the variable drag characteristic of the actual pipeline and the imposed drag remains approximately constant, and the vehicle moves at a speed substantially equal to the average flow velocity of the fluid in the pipeline.

Figure 3:
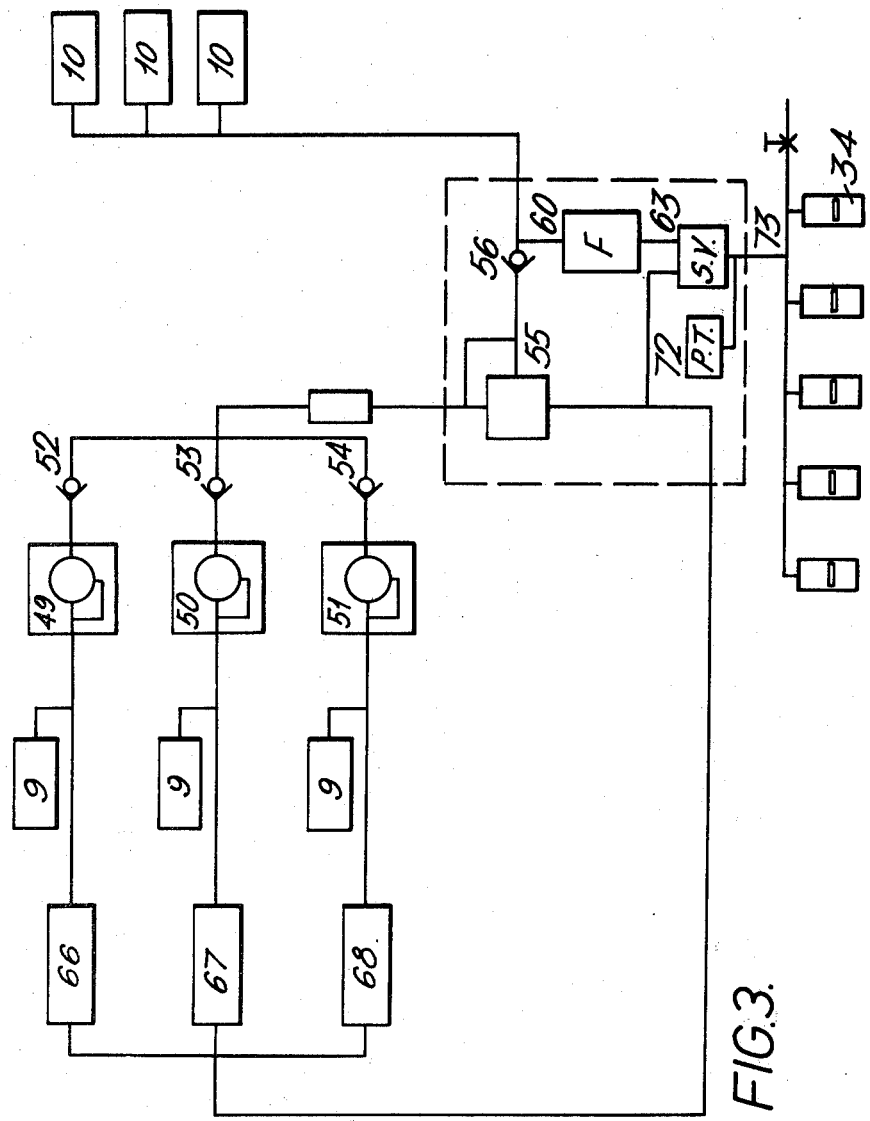
FIG. 3 is a diagram of the hydraulic circuit for the braking system applied to the trailed vehicle.

FIG. 3 shows the hydraulic actuating system which comprises a number of wheel-driven pumps 12, the wheels being driven as the on line inspection vehicle moves along the pipeline. Each high pressure pump pumps the oil through the non-return valves 52, 53 and 54 to a manifold which leads the high pressure oil to a combined relief and unloading valve 55 on to a non-return valve 56, the oil which passes through the non-return valve 56 is fed to high pressure accumulators 10. The oil from the non-return valve 56 also leads down the filter 60 which is used for filtering and cleaning the oil. The oil from the filter 60 is fed into a servo-valve 63 which is used to control the brake pad braking rams 34 as shown in FIG. 5 (only one is shown for ease of drawing). A return line leads the oil back through oil coolers 66, 67 and 68 which, for practical purposes, are concentric tubes in each of which a flow of pipeline gas is arranged to cool the hydraulic oil.

The oil from the coolers flows back to the inlet side of the high pressure pumps 49, 50 and 51 and to low pressure accumulators 9. A pressure transducer 72 is mounted within the oil line 73 which leads from the servo-valve 63 to the brake rams 34.

The braking force is provided by the braking pads 29, 30, 31 and 32, these pads are hydraulically actuated to give the variable radial contact force against the internal surfaces of the pipe wall 28 and so vary the actual drag of the vehicle.

The provision of low pressure accumulators in the hydraulic circuit have a two-fold operation: firstly to act as a sump for hydraulic fluid, and secondly to maintain the system's minimum operating pressure independent of the pipeline gas pressure.

Disturbances to pipeline inclination, friction, and gas flow which occur during vehicle operation can act either to increase or to decrease the vehicle speed and therefore by virtue of the control system to increase or decrease the brake pressure provided to moderate the disturbance. The range of brake pressures available from the hydraulic system is limited by design considerations (such as stress levels, pump and seal performance etc). It is preferable, therefore, that in the absence of disturbances, the brake pressure be held at a value somewhere near the middle of the range of available pressures. This will result in the system being able to compensate for changes in either direction.

The braking control system, as shown in FIG. 4, operates as follows. The actual speed of the vehicle is measured by a wheel type velocity transducer. The signal from transducer 11 (as shown in FIGS. 1 and 5) is fed into a component (80) which can compare the signal with a pre-determined "speed reference signal" to produce a speed discrepancy signal. The discrepancy signal is fed into a two-term velocity controller 75 which determines the braking system pressure required to correct the speed discrepancy. The braking system pressure operates on the rams 34 and increases or decreases pressure between the brake pads and the pipe wall to maintain the actual brake pressure at the value required by the speed controller 75.

An inner control loop involving a comparison component 76, a servo-amplifier 77, the servo valve 63 and the brake pressure transducer 72 act to keep the actual braking pressure to the ram 34 at the desired value required. A signal conditioning unit 78 and a set velocity computer 79 determine the required, or set, velocity of the vehicle by comparison of the average brake pressure over a period of time with a pre-set reference brake pressure fed into the computer 79.

It will be appreciated that the invention has many inherent advantages in providing a capability for controlling the speed of an inspection vehicle with accuracy within an acceptable speed range for example within a range of 4 ft./Sec. to 12 ft./Sec. subject only to limitations introduced by the speed of fluid flow in the pipeline and to limit the maximum rate of change of speed to 1 ft./Sec. in 5 Sec.

We claim:

1. A method of detecting flaws in a pipeline which comprises
    positioning an inspection vehicle which has flaw-detecting sensors and brake pads in said pipeline,
    passing a fluid through said pipeline to cause said inspection vehicle to move therealong,
    causing the brake pads of the inspection vehicle to contact the inner wall of the pipeline with a varying pressure so as to superimpose a varying continuous tractive (drag) resistance on the operationally induced tractive resistance to the vehicle and thereby maintain the total tractive resistance of the vehicle approximately constant such that the vehicle moves at a speed substantially equal to the average flow velocity of the fluid in the pipeline.

2. In a method of inspecting a pipeline in which a pipeline inspection vehicle is propelled internally along the pipeline by the flow of fluid therethrough, the pipeline inspection vehicle having multiple brake means therearound capable of adjustable contact with the internal wall of said pipeline, the improvement comprising continuously applying said brake means against said pipeline wall and continuously varying the pressure of application in response to the average velocity of fluid flow through the pipeline so as to cause said inspection vehicle to move therealong at a substantially constant speed.

3. The method of claim 2 wherein the pressure of application of the brake means of said inspection vehicle against the internal wall of said pipeline is varied between upper and lower limits.

* * * * *

UNITED STATES PATENT AND TRADEMARK OFFICE
CERTIFICATE OF CORRECTION

PATENT NO. : 4,388,871

DATED : June 21, 1983

INVENTOR(S) : John Colin Braithwaite and Ian Smith

It is certified that error appears in the above-identified patent and that said Letters Patent are hereby corrected as shown below:

On The Title Page:
[30] Foreign Application Priority Data

Jul. 27, 1977 [GB] United Kingdom.......31507/77

Signed and Sealed this

Twenty-seventh Day of September 1983

[SEAL]

Attest:

Attesting Officer

GERALD J. MOSSINGHOFF

Commissioner of Patents and Trademarks